(12) United States Patent
Gridish et al.

(10) Patent No.: US 11,221,305 B2
(45) Date of Patent: Jan. 11, 2022

(54) OBJECT MARKING SYSTEM AND METHOD

(71) Applicant: Security Matters Ltd., D.N. Hevel Eilot (IL)

(72) Inventors: Yaakov Gridish, Yoqneam Ilit (IL); Tzemah Kislev, Mazkeret Bathya (IL); Haggai Alon, Kibbutz Naan (IL); Nadav Yoran, Tel Aviv (IL); Mor Kaplinsky, Herzliya (IL); Avital Trachtman, Tel Aviv (IL)

(73) Assignee: SECURITY MATTERS LTD., D.N. Hevel Eilot (IL)

( * ) Notice: Subject to any disclaimer, the term of this patent is extended or adjusted under 35 U.S.C. 154(b) by 161 days.

(21) Appl. No.: 16/609,700

(22) PCT Filed: May 15, 2018

(86) PCT No.: PCT/IL2018/050527
§ 371 (c)(1),
(2) Date: Oct. 30, 2019

(87) PCT Pub. No.: WO2018/211502
PCT Pub. Date: Nov. 22, 2018

(65) Prior Publication Data
US 2020/0057428 A1 Feb. 20, 2020

Related U.S. Application Data

(60) Provisional application No. 62/506,152, filed on May 15, 2017.

(51) Int. Cl.
*G01N 23/223* (2006.01)
(52) U.S. Cl.
CPC ..... *G01N 23/223* (2013.01); *G01N 2223/076* (2013.01)

(58) Field of Classification Search
CPC ................ G01N 23/223; G01N 2223/076
See application file for complete search history.

(56) References Cited

U.S. PATENT DOCUMENTS

| 2,259,400 | A | * | 10/1941 | Switzer | G01N 21/91 |
| | | | | | 250/302 |
| 4,767,205 | A | * | 8/1988 | Schwartz | D06H 1/00 |
| | | | | | 356/71 |

(Continued)

FOREIGN PATENT DOCUMENTS

| WO | 2016014895 A1 | 1/2016 |
| WO | 2016157185 A1 | 10/2016 |

(Continued)

*Primary Examiner* — Chih-Cheng Kao
(74) *Attorney, Agent, or Firm* — Browdy and Neimark, PLLC

(57) ABSTRACT

Systems and methods for marking of objects, such as keys/key-blanks, in a production line are disclosed. The objects are marked by applying a marking composition(s) to pre-selected areas on the surface thereof. The system includes a marking unit for dispensing a volume of marking composition in one or more localized pre-selected areas on the surface of an object to be marked; a holder/gripper for positioning the object to be marked in one or more positions relative to the marking unit so as to allow the marking unit to dispense the marking composition on the one or more pre-selected localized areas; a reading/verification unit for detecting the marking composition applied to the object thereby verifying that the objects are properly marked; an orientation sensing unit for identifying the orientation of the object to be marked relatively to the holder. The system also includes a controller configured for controlling the operation of the holder, orientation sensing unit, and the marking unit. The reading/verification unit is adapted to identify the marking composition in the one or more pre-selected areas on surface of the object by detecting an electromagnetic (Continued)

signal (such as XRF signal) emitted from the marking composition (e.g. in response to its illumination by X-ray or gamma-ray).

21 Claims, 5 Drawing Sheets

(56) References Cited

U.S. PATENT DOCUMENTS

| | | |
|---|---|---|
| 6,533,181 B1 | 3/2003 | Roxby et al. |
| 2003/0063154 A1* | 4/2003 | Goto .................. B41J 2/16547 347/40 |
| 2006/0098071 A1* | 5/2006 | Tanabe ................... B41J 11/70 347/101 |
| 2007/0121181 A1* | 5/2007 | Moon ................ G01N 23/2005 359/2 |
| 2007/0298059 A1 | 12/2007 | Tiedemann et al. |
| 2009/0188638 A1* | 7/2009 | Chalaye ................ D21H 21/40 162/140 |
| 2013/0071941 A1 | 3/2013 | Miller |
| 2013/0158947 A1 | 6/2013 | Suzuki |
| 2015/0018538 A1 | 1/2015 | Berrada et al. |
| 2017/0205362 A1* | 7/2017 | La Belle ............. G01N 23/223 |

FOREIGN PATENT DOCUMENTS

| | | |
|---|---|---|
| WO | 2017134660 A1 | 8/2017 |
| WO | 2018051353 A1 | 3/2018 |

\* cited by examiner

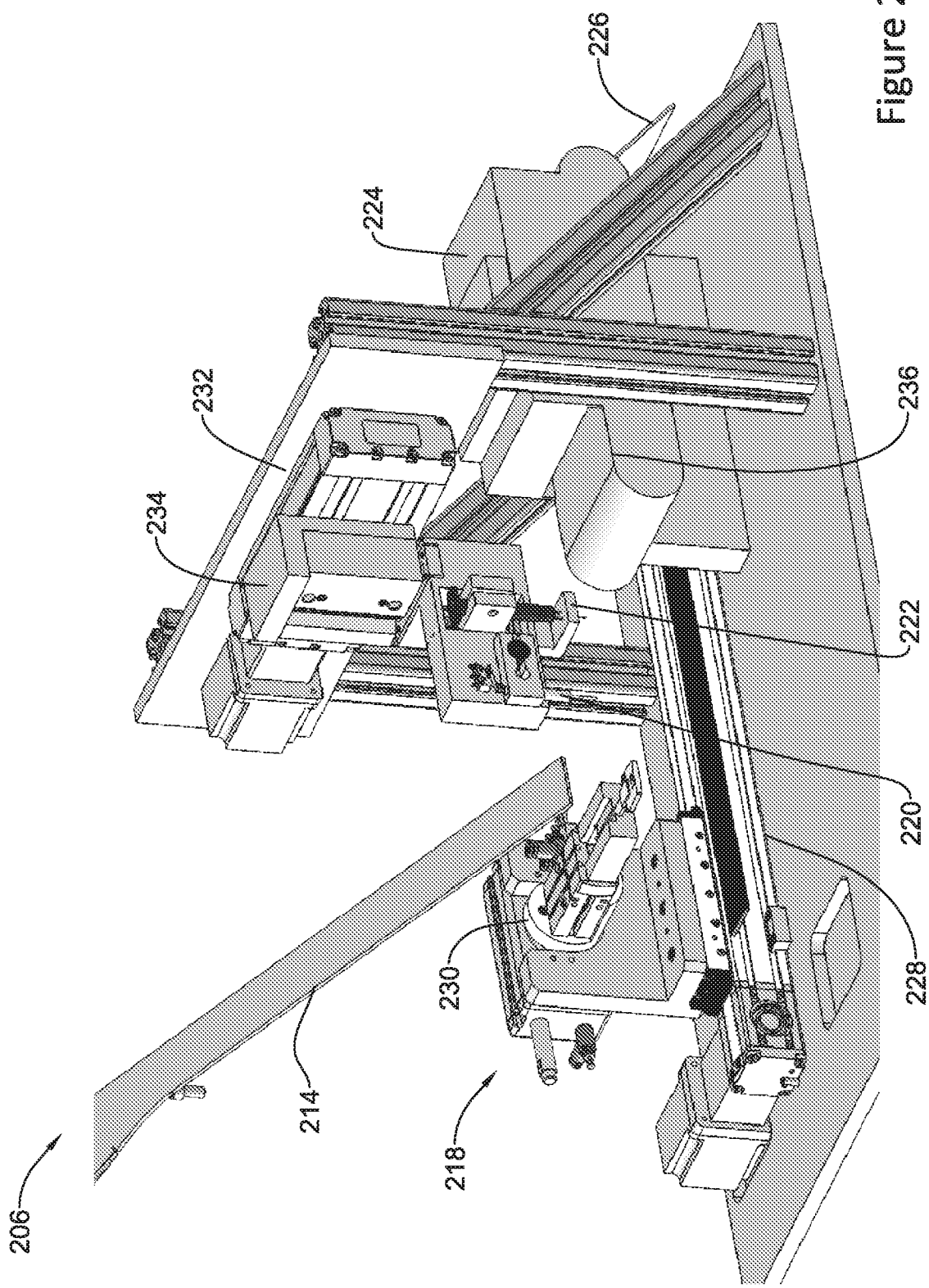

OBJECT MARKING SYSTEM AND METHOD

TECHNICAL FIELD

The invention is in the field of object marking and more particularly relates to techniques for application of X-ray fluorescence (XRF) markers.

BACKGROUND

Counterfeiting and supply chain diversion of materials and products are phenomena that impact many fields. Various types of products, including but not limited to consumer goods, electronics, polymers and pharmaceuticals, are counterfeited and enter the supply chain, often by copying labeling associated with "brand" companies. Techniques and devices for marking materials and products for uses such as authentication and brand protection as well as traceability, chain of supply management and process control are known in the art.

For example, US Patent Application Publication No. 2015/0018538 discloses method and device for marking an article for security, tracking or authentication. The method includes depositing a solution comprising a nucleic acid marker onto at least a portion of the article, wherein the nucleic acid marker may be activated, for example, by adding a functional group to the nucleic acid marker.

U.S. Pat. No. 6,533,181 discloses an automated method for creating impressions of machine-readable encoded symbology using thermojet type solid object printing technology. This is accomplished by electronically transmitting a software file containing a part identification symbol representation in Computer Assisted Drawing (CAD) software format to a solid object printer where tiny droplets of a wax like material are deposited in successive layers to form a three-dimensional pattern insert containing representations of the encoded symbology for combination with a pattern replica of a part to be encoded by said symbology. A casting mold is thereafter formed from the combined pattern and a casting is made from the mold to result in a machine readable 2D Data Matrix type encoded, directly marked, part.

GENERAL DESCRIPTION

The present invention provides a novel system for marking objects by applying or dispensing a marking composition to one or more pre-selected localized areas or spots on the objects (e.g. on the surface thereof). The marking of the objects may be used for various purposes where attaching an identifying information and/or other information to the object is required, for example for the purposes of authentication, counterfeit prevention, brand protection, traceability, chain of supply management, and product-diversion prevention.

The marking composition used in the technique of the present invention may include for example one or more marker materials (hereinafter "markers") which may be detected and identified by directing an electromagnetic signal (e.g. IR, UV and X-ray) towards the marked area or spot and by detecting and analyzing the spectrum of the electromagnetic signal that is emitted by the marking composition in response. In addition, the marking composition may include additional materials (e.g. surface binding materials—binders, surfactants, etchants, adhesion promoters) for contributing to the adherence of the marking composition to the surface of the object, and/or to its resilience.

The marking system of the present invention is configured to apply or dispense one or more marking compositions selected from a plurality of marking compositions onto one or more preselected areas/surfaces or spots on an object. In an embodiment, the marking system is configured to mark a plurality of objects, that is to apply a marking composition to an object which can be any one of a plurality of different types of objects. The specific marking composition which is applied to an object is determined according to information one wishes to attach to the marked object. For example, the marking composition may be associated with a coding system wherein the specific codeword is set by the set of markers and by their concentration and/or relative concentration within the marking composition. The marking (and the specific codeword) may also be determined be the materials of the object and additional materials that may be present on the surface of the object, as well as by the manner in which the marking on the object is read. For example, the reading of the marking may be affected by geometrical configuration of the object relatively to the device which reads the marking (e.g. an X-ray fluorescence analyzer). The information attached to the object (the code) may include a serial number or batch number identifying the specific object or a batch, the date of manufacture or date of shipment/supply, the destination of the object or a specific client/supplier and so on. The specific type of object which is to be marked may be set by user input or alternatively may be automatically identified and set by the marking device. The specific marking composition to be applied to an object may be set by user input or automatically according to various parameters (set by user or identified automatically), such as time and date, type of object, serial and/or batch number and so on.

The marking system of the present invention is configured to receive an object to be marked (out of a plurality of possible types of objects) and inspect it so as to identify its orientation and the areas on the surface of the objects on which the marking composition should be applied. The areas may be for example predetermined/preselected areas regions on the surface of the object. To this end, the object to be marked may be a key (e.g. mechanical key and/or electronical card/chip serving as a key. The marking may be used to facilitate additional layer of protection (e.g. providing key authentication) and may be required to be located in at least one of one or more predetermine locations and/or orientations on the object/key.

To this end the object to be marked may be received by the marking device in one of plurality (or continuum) of possible orientations. In an embodiment, the marking device includes a holder (e.g. a gripper unit) configured and operable to hold the object and rotate and move the object into a suitable orientation in which it is to be inspected for determining and identifying the orientation of the object and the areas to be marked on its surface; and then one or more marking compositions are applied onto these identified areas of the object. For the purpose of identifying the orientation of the object and the marking system includes an orientation sensing unit which inspects the objects and determines its orientation and the positions of the areas on the surface of the object which should be marked. The orientation sensing unit determines the orientation of the object by detecting localized features on the surface of the object such as visual features, physical features (such as projections, protrusions and grooves), electrical and/or magnetic features. Accordingly, the orientation sensing unit may include mechanical sensors, optical or visual sensors (e.g. camera), magnetic and/or electric sensors.

Once the orientation of the object is determined and the areas to be marked are identified, the object is marked by a marking unit which applies one or more marking compositions to these areas. The marking unit may include one or more systems for dispensing or depositing the marking composition onto the surface of the object. These systems may employ techniques such as printing, stamping, spraying, injecting, brushing, and air brushing, for dispensing measured volumes of the marking composition onto the areas to marked on the surface of the object. In a particular embodiment, the marking device includes one or more injecting systems wherein each injecting system comprises a container for the marking composition and an injector tube or a needle through which the marking composition is deposited. In an alternative embodiment, the marking device includes a plurality of containers for plurality of marking compositions and a single injector, needle or tube for the application of the marking composition.

In an embodiment, the marking device may include a curing unit for drying or curing the marking composition after its application on the surface of the object in order to better attach the marking compositions to the surface of the object. Such curing unit may include one or more means such as a UV lamp, a heating means and a fan, for curing the marking composition.

In some embodiments the marking system is configured to be installed and operate online as a part of a production line. Namely, the marking system is configured to sequentially receive a plurality of objects (e.g. keys/key-blanks) mark one or more pre-selected areas or spots on each of the objects and output a sequence of marked objects. The marked objects may be finished products or may be components or unfinished products that proceed through the production line.

In an embodiment, the marking device may further include a reading unit for detecting the marking compositions and/or measuring their concentrations or relative concentration in the preselected areas on the surface on the object. In an example the marking composition includes markers which are identifiable by XRF analysis and the verification unit comprises an XRF analyzer which emits an X-ray or Gamma-ray radiation towards the object and detects the X-ray signal (a response signal) that is emitted from the markers in response. Such an XRF analyzer may be configured to measure/estimate the concentration or relative concentration of each of the markers according to the detected response signal. The concentrations of the markers may be indicative of the information encoded by the marking composition on the object. Accordingly, based on the measured/estimated concentration the system may be configured and operable to verifying that the applied marker composition indeed matches/encodes the intended information/authentication data that should have had being marked on the object and possibly also verifies the quality of the marking applied by the marking device (i.e. the quality may be determined based on the signal to noise (SNR) of the detected signal).

The reading unit may also be configured to identify and provide indication of deficiencies or failures in the production process of the objects. For example, a detector or a spectrometer may identify deformations to the shape of the manufactured objects since the response signal arriving from the object may depend also on the distance and relative angles between the object and the detector. In another example, the verification unit may measure the rate of the marking process (i.e. the number of objects marked per time unit), which may provide an indication to the rate or capacity of the production process of the objects.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 2A and 2B show a system for localized marking of objects such as keys or key blanks in accordance with an embodiment of the invention.

DETAILED DESCRIPTION OF EMBODIMENTS

Figure 1:
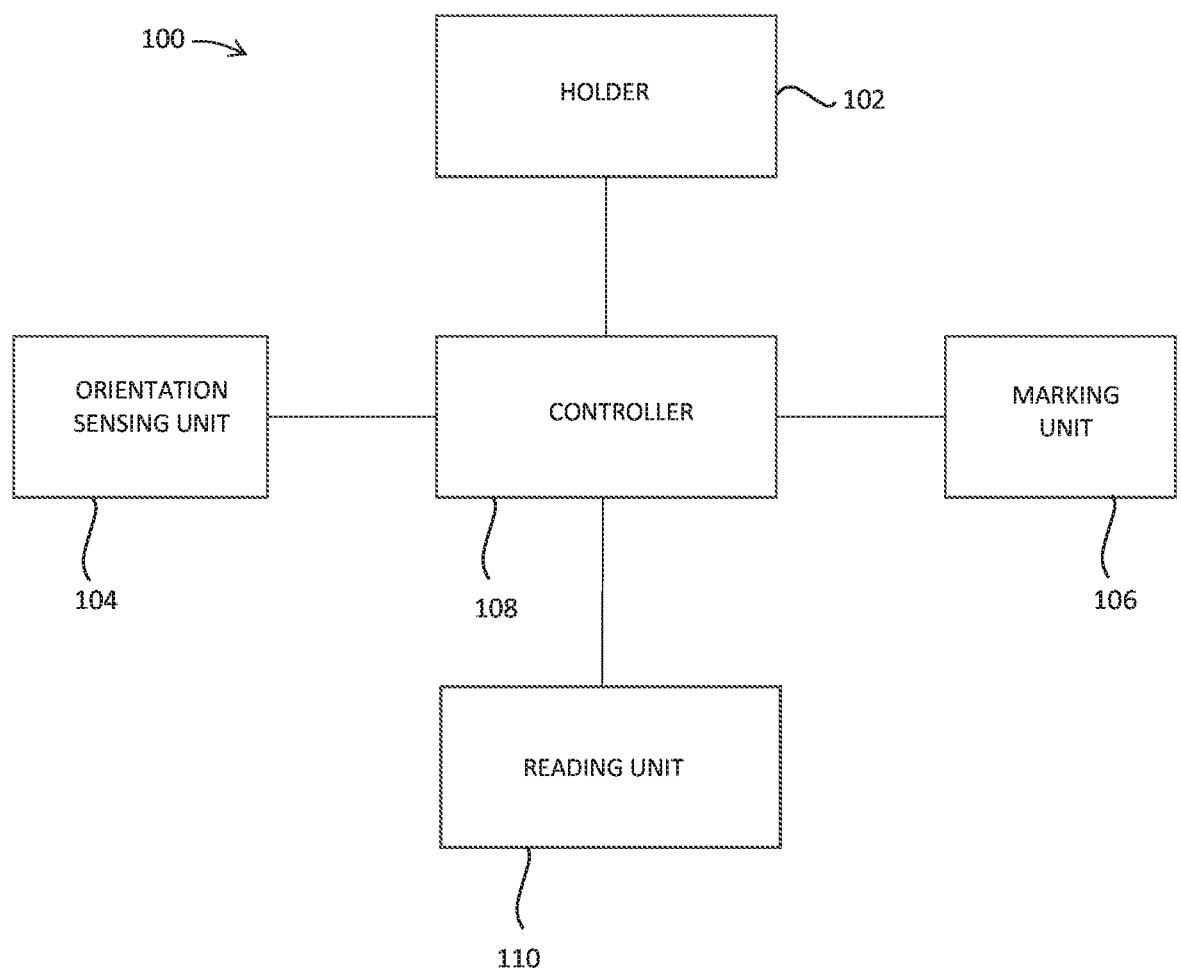
FIG. 1 is a block diagram of a system of the invention for applying/depositing/dispensing a marking composition to localized areas on the surface of objects.

Reference is now made to FIG. 1 which is a block diagram of a marking system 100 according to an embodiment of the present invention. The marking system includes a holder 102 (e.g. gripper), an orientation sensing unit 104, a marking unit 106, and a controller 108 and a reading unit 110. The holder 102, the orientation sensing unit 104, the marking unit 106, and the reading unit 110 are each coupled, physically or wirelessly, with the controller 108.

The controller 108 is appropriately configured and operable for controlling the marking process being performed by the system 100 to provide desired material composition in one or more desired surface areas and in a desired quantity in accordance with the type of object that is to be marked. The controller may control and regulate the deposition of the marking composition, the speed and rate of the marking process (e.g. the number of objects marked per unit time), and the interface with adjacent stations in the production line, wherein, for example, the particular type of marking composition and the volume deposited on to the object, as well as other parameters of the marking process may be set by the controller according to the type of object that is to be marked. The controller may also be configured to control the reading and verification process ensuring that the marking process is operating adequately and that the objects are properly marked. For example, the controller may set various parameters of the reading unit 110 (e.g. select a suitable calibration for the reading which may depend on the type of the object). The controller 108 is typically a computer system including inter alia such functional utilities as data input and output utilities, memory, processor utility, and also includes a material deposition controller 108 receiving user input about the marking composition to be deposited onto the object and generating corresponding operating parameters to the marking unit 106.

The holder 102 receives the object to be marked by means of a feeding system (not shown in FIG. 1). Such feeding system may for example include a conveyor, an entry slide, an object pusher, robotic arms and possibly other components. The feeding system may also include a sensor (such as a magnetic, an optical, or a mechanical sensor) for detecting and indicating that an object is present in the feeding mechanism ready to be handled and marked.

The holder 102 may include gripping means to hold/handle the objects. The holder 102 may include one, two or three pivots such that in may rotate the object it retains around one, two, or three axes (e.g. orthogonal axes). The holder 102 can move relatively to the orientation sensing unit 104 and the marking unit 106. For example, the holder 102 may be assembled to a frame of the marking system 100 by means of one, two or three axes. Once the holder 102 grips an object to be marked from the feeding system it moves towards the orientation sensing unit 104 to be inspected. The orientation sensing unit 104 identifies the orientation of the objects and provides an indication to the controller 108 whether and how the holder 102 should rotate the object to be marked to a suitable orientation, so that the marking system 106 can dispense the marking composition in the exact areas and/or spots preselected to be marked. Once the object was inspected by the orientation sensing unit 104 the holder 102 rotates the object to a suitable orientation and moves it towards the marking unit in order to be marked.

In an embodiment of the invention the holder 102 is configured to move the object towards the orientation sensing unit 104 and the marking unit 106. In an alternative embodiment, the holder 102 may be fixed while the orientation sensing unit 104 and the marking unit 106 are configured to move towards the position of the object gripped by the holder 102. In yet another embodiment all three components, the holder 102, the orientation sensing unit 104, and the marking unit 106 are movable in one, two or three axes (for instance, x, y and z axes determined relatively to a frame carrying the marking system). For example, the holder 102 may be movable along the x axis, while the orientation sensing unit 104 and the marking unit 106 may be movable along the y and z axes.

The orientation sensing unit 104 is configured to identify features present on the outer surfaces of object and according to the position of these feature provide an indication to the controller 108 how to set the orientation of the object relatively to the marking unit 106 so that the marking can be dispensed accurately on the preselected areas. The features on the surface of the object identified by the orientation sensing unit 104 may be: visual features such as areas of a different color or shade, lines dots or shapes which are printed or imprinted on the object; physical features such as protrusions, projections, recesses, grooves and impressions; electric or magnetic features such as variations in resistivity, capacitance, or magnetic susceptibility. Accordingly, the orientation sensing unit 104 may include optical and/or visual sensors (e.g. camera), mechanical sensors, laser sensors, electric and/or magnetic sensors and the like.

For example, a physical feature such as a projection from the surface of the object can be identified by measuring the distance from the top side of the projection a to a preselected reference position, by means such as a mechanical probe measuring or a laser sensor. Once the orientation sensing unit 104 provides an indication that the preselected feature has been identified, the orientation of the object which is retained by the griping unit may be calculated. The holder 102 may then rotate it to suitable orientation and bring it to a suitable position such that the marking unit 106 may apply a measured quantity of the marking composition to the exact spots or areas preselected to be marked.

The marking unit 106 is configured to apply or dispense a volume of one or more marking compositions, wherein each marking composition includes one or more markers, to one or more preselected areas or spots on the surface of the object. In a particular example the spots or area preselected to be marked may positioned on the features identified by the orientation sensing unit 104. The marking unit 106 may dispense the marking compositions by using printing (such as inkjet printing, laser printing, pad printing, thermal printing and other printing methods); stamping; spraying systems; injecting systems; and other dispensing method. In a particular example, an injector is used to dispense a minute volume of a marking composition to a preselected small spot on the surface of the object. For example, the volume of marking composition dispensed onto the surface of the object may be between 0.1 µl and 50 µl, between 0.1 µl and 10 µl, or between 0.5 µl and 5 µl.

The marking composition applied to the object generally includes a marking system, which typically comprises a plurality of marker materials (herein "markers"); each of said markers emits an identifiable electromagnetic response signal in response to interrogation (irradiation) by electromagnetic radiation (such as in the UV, IR, visible light, or X-ray ranges). In a particular example, the markers may be materials which emit X-ray response signals (secondary radiation) in response to being exposed to X-ray or Gamma-ray radiation (primary radiation). An X-ray response signals emitted from a marker have a characteristic wavelength range which may identify the marker. In addition, to markers the marking composition may include additional compounds and agents such as, surface binding materials (binders), surfactants, chemical etchants, adhesion promoters, polymerization initiators, wetting agents, solvents, and other materials. For example, the marking composition may be of the types described in WO 2017/134660 which is incorporated herein by reference. In general, the marking composition is covert and cannot be detected without a suitable detector or measuring device, such as, a spectrometer or an XRF analyser. That is, the marking composition may be invisible, and does not affect the appearance of the object or is physical, chemical, electric or magnetic properties. For the purpose of overtly marking an object inks or dyes may be added to the marking composition, making the marking visible.

In addition to detecting the presence of the one or more markers the concentration and/or relative concentration of the markers present in the marked areas on the surface of the object can be also measured. In some embodiments, the concentrations of the one or more markers within the marking composition are determined according to a preselected code. The code may be used for purposes such as anti-counterfeit protection, authentication, brand protection, and chain-of-supply management, and process control. For example, the codes may correspond to one or more of: manufacturer, owner and the object, or to supplier, date of manufacture, shipment, or supply, batch, and so on. The code may be stored in a database included within the controller 108, alternatively the data base may be stored on a remote device.

Marking system 100 may include a reading unit 110 for reading the marking on the object and verifying that the objects are properly marked. Additionally, the reading unit may be used for process control providing an indication whether the production process operates adequately or not. The reading unit 110 may include a detector (e.g. a spectrometer) for detecting and identifying the one or more markers in the marking composition and optionally measure the concentration of the markers in the preselected areas on the surface of the object. The reading unit 110 may also include an emitter for irradiating the marked areas or spots on the objects surface so as to cause the markers to emit characteristic electromagnetic signals. In an example, the emitter emits X-ray or Gamma-ray. The spectrometer and emitter may be included in a single device such as an XRF analyzer. The reading unit 110 may further include a processor for processing the response X-ray signal for determining the quantity, concentration and/or relative concentration, of the one or more markers present on the surface of the object. Additionally, the processor may process the response X-ray signal so as to filter noise and clutter and achieve better signal to noise ratio facilitating an accurate measurement of the marking composition and the markers thereby allowing use of smaller volumes of marking composition. For example, the processor may employ the methods for reading XRF markings described in International Patent Application Publication WO 2016/157185 which is incorporated herein by reference. The processor may be incorporated within the XRF analyzer. In an example, the XRF analyzer may be of the type described in International Patent Application Publication WO 2018/051353 which is incorporated herein by reference. The processor may also determine a code corresponding to the measured quantities or concentrations of the markers. The database storing the code may be included be in the processor of the reading unit 110. Optionally, the database may be stored on a remote device. In another example, both the processor and the database may be included in a remote device which communicates with the detector and/or the controller 108 and receives the response signal or an encrypted or processed version of the response signal and further processes it to obtain the quantities and/or concentrations of the markers on the object. In yet another example the database and/or the processor may also be included within the controller 108.

In an embodiment of the invention the reading unit 110 may also provide indications to failures and deficiencies that may occur during production, thereby assuring quality of the production process. For example, the reading unit 110 may be configured to measure the rate of the marking (i.e. number of objects marked in a time unit). The reading unit 110 may be configured to provide an indication that a deviation from a preselected marking rate (which may be indicative of a problem or a failing in the production line) occurs. In addition, the reading unit 110 may be adapted to detect alterations or deformations to the shape of the objects. For example, an electromagnetic response signal arriving from a marked object may also be affected by the shape of the surface of the object, since it may vary with the distance and the relative angles between the surface of the object and a detector which detects the response signal. Therefore, a reading unit 110 which includes a detector or a spectrometer (e.g. an XRF analyzer) for detecting response signals from the marked objects would enable the detection and identification of such modifications.

In an aspect of the present invention the reading unit 110 is configured to interrogate each of the marked objects that exit the marking unit or the curing unit in an online manner, for example, as a part of a production line. Namely, detect or measure the concentration of the markers on each of the object exiting the marking unit or the curing unit. In a different example the reading unit 110 is configured to measure some of the marked objects exiting the marking unit. In yet another example, the reading unit 110 is configured to allow an operator to inspect some of objects exiting the marking unit or the curing unit.

In addition, marking system 100 may also include a curing unit (not shown in FIG. 1) for curing or drying the marking composition in order to better adhere the marking composition to the surface of the object. The process applied to the object in the curing system depends on the nature of the particular marking composition. In an example the marking composition includes a UV cured adhesive, and accordingly the curing system includes a UV source. In another example the marking composition includes an adhesive which solidifies and/or undergoes polymerization via evaporation and the curing system includes a fan and/or a heating device. Once the marking unit dispenses the marking composition onto the surface of the object, the holder 102 delivers or releases the object onto the curing system which may further include a conveyor, a tray, or other means in which the curing or drying process is taking place.

Figure 2A:
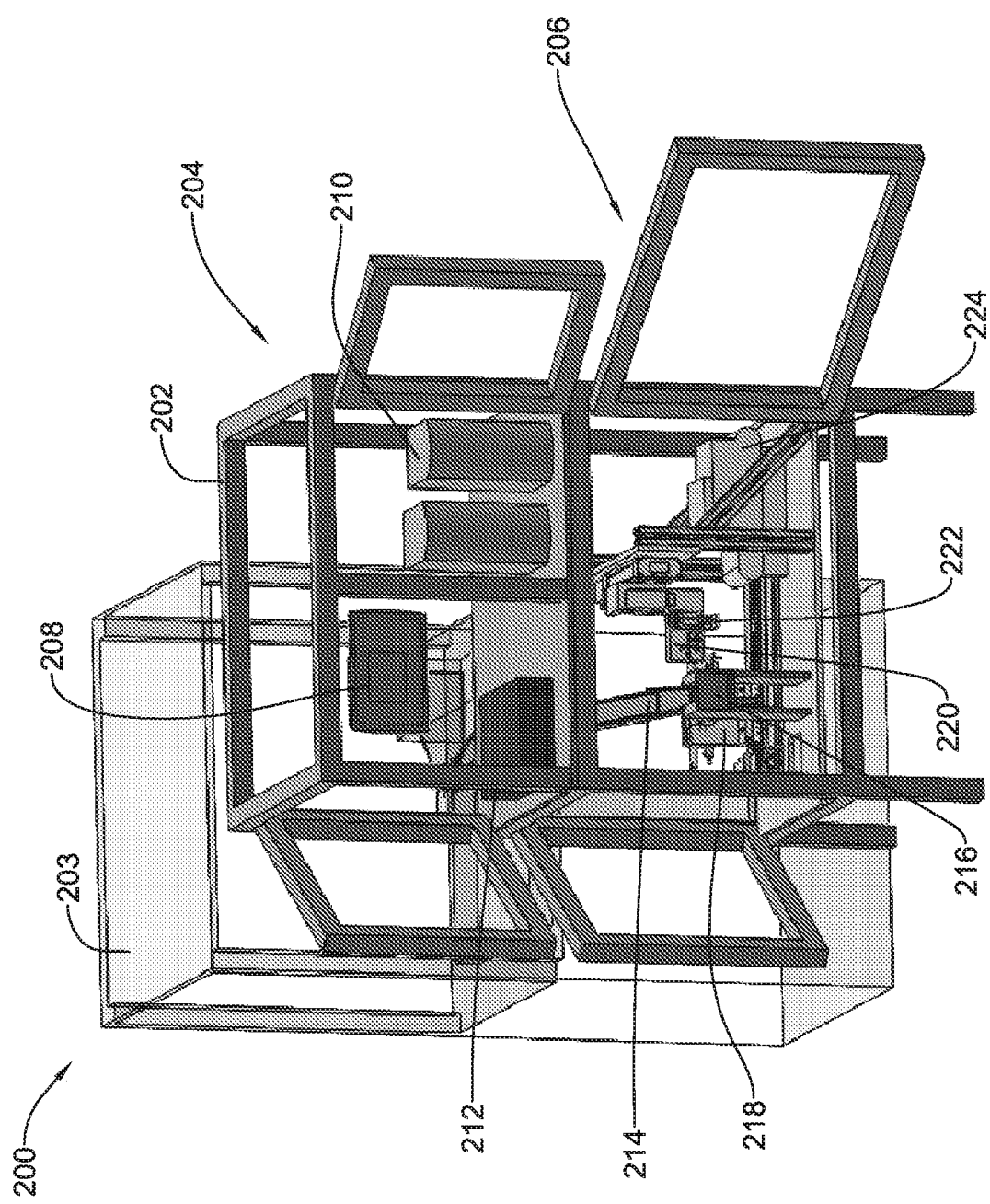

Reference in now made to FIGS. 2A-2B which are schematic illustrations of a system for marking keys and/or key blanks generally referenced 200, which is a particular example of the present invention. FIG. 2A is a perspective view of marking system 200 which includes a frame 202 with an upper unit 204 and a lower unit 206. Also shown in FIG. 2A is the outline of a machine or station on a production line 203 (not being a part of system 200) which outputs keys or key blanks to system 200 to be marked. Upper unit 204 includes an electricity and pneumatics control board 208, a reading unit 210 and a controller 212. Lower unit 206 includes an entry slide 214, a feeding unit 216 a holder 218, an orientation sensing unit 220, a marking unit 222, a curing unit 224, and an exit slide 226 (shown in FIG. 2B). The marking system 200 is configured to mark keys or key blanks in an on-line manner as a part of a production line (hereinafter the term "key" is used to signify both key and key blank). Namely, system 200 receives a sequence of keys marks them and outputs a sequence of marked keys. The system 200 is configured to mark a plurality of key types of different shapes and dimensions. The marking unit 222 may apply a different marking composition or compositions to each key type. The areas on which the marking composition is deposited may also depend on the key type. The type of the key may be set by the controller 212 according to user input. The feeding unit 216 and the holder 218 are configured to receive and handle each of the plurality of key types. In addition, the orientation sensing unit 220 is configured to identify the orientation of each of the key types.

The keys to be marked enter the marking system via entry slide 214. Each key is received by the feeding unit 216. The feeding unit 216 includes a key pusher (not shown) which pushes the key into the holder 218. The holder 218 grips the key such that the flat sides of its handle (grip) are turned up and down (as shown in FIG. 2B). Hence the key is held in the holder 102 in one of two possible orientations, a first flat side in turned up and the second—its opposite side—facing down, or vice versa. In general, the keys may enter the holder 102 in any of the two orientations randomly.

The holder 218 can rotate around the y-axis (the axis of symmetry along the length of the key). Additionally, the holder 218 can move along a linear rail system in the x-axis direction. The orientation sensing unit 220 and the marking unit 222 can move jointly along a linear rail in the y-axis direction, and vertically (the z-axis) by a z-axis linear rail assembled on the y-axis linear rail. Using the x-axis linear rail to move the holder 218 and the y-axis linear rail to move the orientation sensing unit 220 and the marking unit 222, any point on the surface of the key facing up can be brought to a position directly under the orientation sensing unit 220 and/or to a position directly under the marking unit 222.

Upon gripping a key the holder 218 delivers the key along the x-axis to a position underneath the orientation sensing unit 220. The key is inspected by the orientation sensing unit 220 which identifies the orientation of the key and the position of the area on the key surface which is to be marked. The orientation sensing unit 220 identifies the orientation of the key by means of a mechanical probe which measures the vertical distance between a reference position and the point on the surface of the key which is directly under the probe.

This distance, provides an indication as to the topographical feature on the surface of the key facing upwards (such as a particular projection or recess) which is directly under the probe, and therefore also to the exact orientation and position of the key. The orientation sensing unit 220 then indicates to the controller 212 what is the orientation and position of the key and whether it should be flipped (rotated by 180° about the y-axis). The holder 218 then moves the key along the x-axis to a position under the marking unit 222 to be marked.

The marking unit 222 includes an injecting system comprising a container for the marking composition and an exit tube or a needle for dispensing the marking composition in one or more preselected spots on the top surface of the key that is facing the needle. The marking composition may be pressed out of the container through the needle by a plunger or a piston (e.g. pneumatic or hydraulic piston). The marking unit 222 may contain a syringe (shown in FIG. 2B) and a piston (not shown) such that the piston presses on the plunger of the syringe to force a preselected quantity of the marking composition on to the spot that is to be marked. The location of the spot or area to be marked may depend on the type of the key such that each type of key may be marked at a different spot. The marking unit 222 may dispense the marking composition onto a plurality of preselected spots (or areas) on the surface of the key. The marking unit 222 may dispense the marking composition on one side of the key (the top side). Alternatively, the holder 218 may rotate the key once the marking unit 222 finished marking the top side of the key to allow the marking unit to mark the opposite side as well. In an embodiment the marking unit may be configured to enable the replacement of the container and optionally the needle or exit tube in order to allow different marking compositions to be applied to the key. In an alternative embodiment the marking unit 222 may include several containers (not shown in FIGS. 2A and 2B) each containing specific marking composition so that different marking compositions may be applied to the key.

Once the marking unit dispenses the marking composition onto the preselected spots the holder 218 delivers the key to a conveyor belt. The conveyor belt (shown in FIG. 2B) carries the key through the curing unit 224, which cures the marking composition, to the exit slide 226. Once the holder 218 delivered the key onto the conveyor belt the it moves back towards the entry slide to receive an additional key such that the marking process may operate 'online' as a part of or at the end of the standard manufacturing process.

The reading unit 210 positioned in the upper unit 204 of the marking system 200 may be used for verifying that a key is properly marked. In an example the reading unit 210 may be used for verifying that a marked key is properly manufactured without unwanted modifications or deformation to its surface (either to the metallic surface of a key or to its plastic grip or both). The reading unit 210 includes an emitter (not shown) for emitting an electromagnetic signal towards the surface of the key, and a detector (not shown) for detecting the response signal and identifying the marking and possibly a code-word which may be associated with the marking. The reading unit 210 is configured to receive and examine any type of key which may be marked by the marking system 200. In an example the reading unit 210 employs XRF analysis to detect and identify the marking applied to the surface of the key. The emitter in this case emits an X-ray or Gamma-ray signal towards to the key and the detector detects an X-ray response signal emitted by atoms present in on or near the surface of the key. The response X-ray signal detected by the detector may be affected by the distance and the relative angles between the surface of the key and the detector therefore the reading unit 210 is able to identify modifications or deformations to the shape of the key.

FIG. 2B is a perspective view of the lower unit 206 of the system for marking keys 200. In addition to the entry slide 214, the holder 218, the orientation sensing unit 220, the marking unit 222, the curing unit 224, and the exit slide 226, also shown in FIG. 2B are the x-axis linear rail 228 on which the holder 218 is assembled, the rotational axis means 230 which enables the rotation of the key around the y-axis, the y-axis linear rail 232, and the z-axis linear rail 234 upon which the orientation sensing unit 220 and the marking unit are assembled, and the conveyor belt 236 (The feeding unit 216 is removed from FIG. 2B). The key to be marked slides down entry slide 214 received be the feeding unit (not shown) which pushed it to the holder 218 such that the one flat/wide face of the key and grip is facing up and the other down. The holder 102 is configured to move along the x-axis linear rail 228 delivering the key to a preselected position to be inspected by the orientation sensing unit 220.

The orientation sensing unit 220 is configured to move along the y-axis linear rail to a position such that the mechanical probe of the orientation sensing unit 220 is positioned above a preselected position on the upper surface of the key. The mechanical probe is configured to measure the distance between a reference position to the point on the key directly underneath it, by moving down along the z-axis linear rail until it contacts the surface of the key. According to the measured distance the controller may determine which particular topological feature on the surface of the key (e.g. a particular protrusion or recess) is positioned directly underneath the mechanical probe. The controller then determines whether to rotate the key by 180° angle (by the rotational axis means 230) or not. Namely, the controller 212 determines which flat side of the key is to be facing up. The distance measured and the topological feature contacted by the orientation sensing unit 220 may also indicate to the controller 212 the exact position of the marking unit in the x-y plane relatively to the upper surface of the key.

Once the orientation of the key is set the holder 218 moves along the x-axis linear rail delivering the key to a position underneath the needle of the marking unit 222. The marking unit 222 is configured to move down along the z-axis linear 234 rail and move along the y-axis linear rail 232 so as to place the needle of the marking unit 222 directly above the spot or area to be marked, and a suitable vertical distance from the surface of the key. The piston presses out a measured volume of marking composition onto the spot or area to be marked. The volume of marking composition deposited onto the surface of the key may set by the controller 212 according to: the type of key to be marked, the area and the feature to be marked on the surface of the key, and the particular marking composition deposited on to the key. The vertical distance of the needle from the surface of the key is also set by the controller 212 such that the volume of marking composition is appropriately deposited on the surface at the preselected area. The volume of the marking composition ejected out of the needle should be continuous (i.e. contained in a single volume), therefore the ejected volume should contact the surface of the key such that surface tension of the volume and the attraction forces between the volume and the surface of the key would cause the exact volume set by the controller 212 to be deposited on the surface of the key, creating a continuous film over the designated area. The deposition of the measured volume as a continuous film over the preselected area on the surface of the key facilitates an accurate detection and measurement of the concentration of the one or more markers by XRF analysis.

The marking unit may mark a plurality of spots or pre-selected areas on either one or more surfaces/sides of the key. Wherein by using the x, y, and z linear rails (228, 232, and 234 respectively), and the rotational axis means 230 the needle of the marking unit 222 and the key can be positioned such that the needle is located at a suitable position to deposit a pre-selected volume of the marking composition to any spot on the surface of the key. The pre-selected volume of marking composition may be in the range between 50 μl and 0.1 μl, preferably between 10 μl and 1 μl.

Once the marking composition is deposited on all preselected areas on the surface of the key, the holder 218 delivers the key to the conveyor belt 236 which carries the key through the curing unit 224 to the exit slide 226. The curing unit 224 may include or more systems for curing and/or drying the marking composition causing it to adhere to the surface of the key including a UV lamp, a heating means, and a fan. The system used for curing the marking composition corresponds to the particular type of marking composition used. For example, a particular marking composition may include a thermoset polymer as a binder which requires a UV lamp for curing. In another example the marking composition may include other types binders which adhere to a surface through the evaporation of a solvent, wherein curing unit 224 include a fan and/or a heating means. Alternatively, the marking composition may include a binder which adheres to the surface of a key within a short time after deposition wherein no curing unit is required. The key undergoes curing while on the conveyor belt 236 delivers the key to the exit slide 226.

Figure 3A:
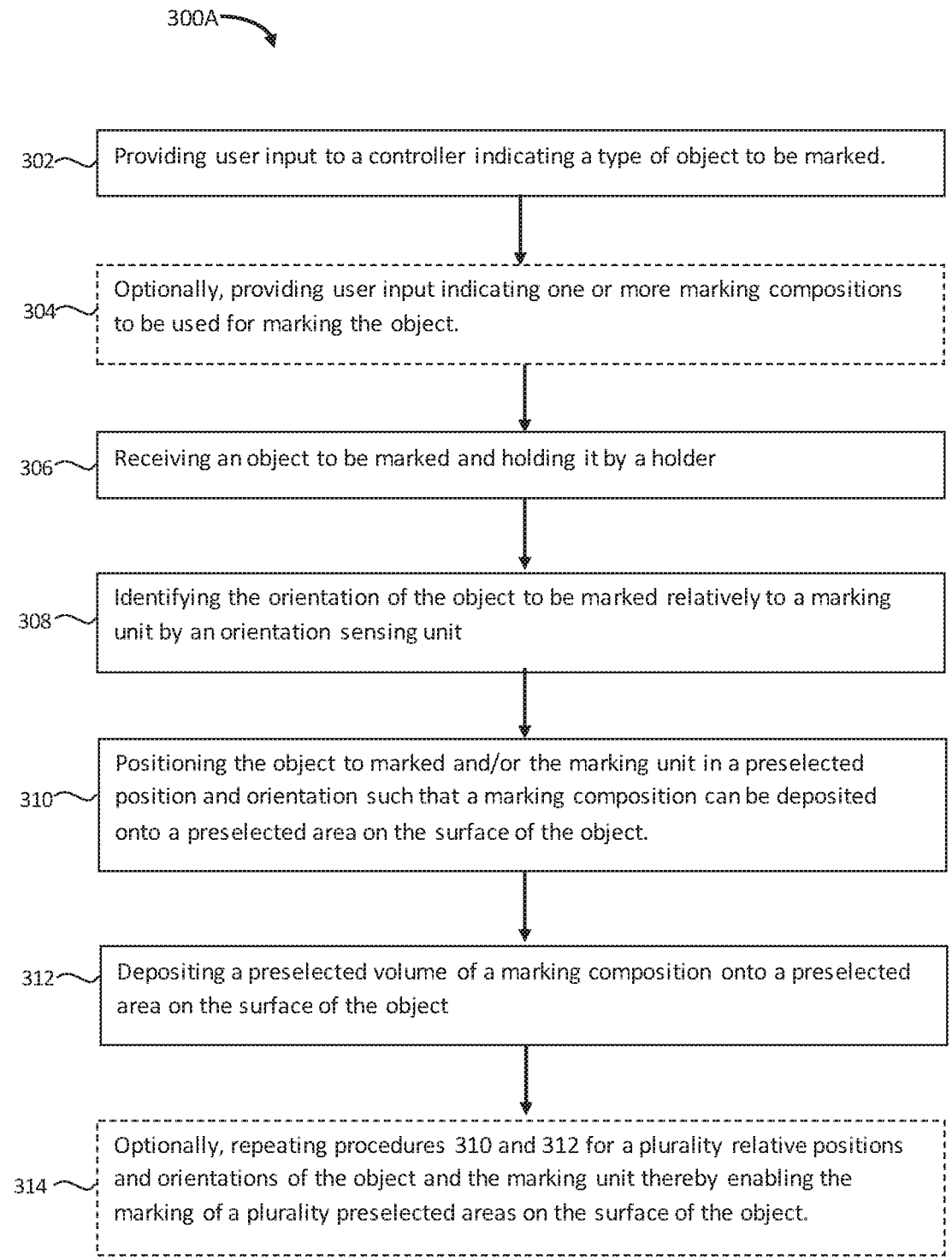
FIGS. 3A and 3B are schematic illustrations of methods for applying localized markings on an object.

Reference is made to FIG. 3A which is a schematic illustration of a method 300A for applying localized marking on objects according to an embodiment of the present invention. The method allows the authentication of the objects by detecting the marking on the objects. In procedure 302 user input is provided to a controller identifying the type of object (or objects) to be marked. In Optional procedure 304, additional user input is provided identifying the type of marking composition which is to be used for marking the objects. The marking composition may include one or more markers such that a plurality of marking compositions may be used wherein each marking composition includes a preselected set of markers in preselected concentrations. In procedure 306, an object to marked is received and held by a holder such that it may be inspected by an orientation sensing device. In procedure 308, the orientation of the object as it is held by the holder relatively to a marking unit is identified by an orientation sensing unit. In procedure 310, the object and/or the marking unit are positioned in preselected positions and orientation relatively to each other, such that the marking unit can mark a preselected area on the surface of the object. In procedure 312, a preselected volume of a marking composition is deposited on to a preselected area on the surface of the object. The specific marking composition can be then detected and identified. Furthermore, the concentration and/or relative concentration of the one or more markers within the marking composition can be detected allowing for any information encoded by the marking composition to be read (for example, for authenticating the object). In optional procedure 314, procedures 310 and 312 are repeated for a preselected number of times each time positioning the object and/or the marking unit in a relative position and orientation that enables the depositing a marking composition (of the same type or possibly of different types) on a different preselected area on the surface of the object.

Figure 3B:
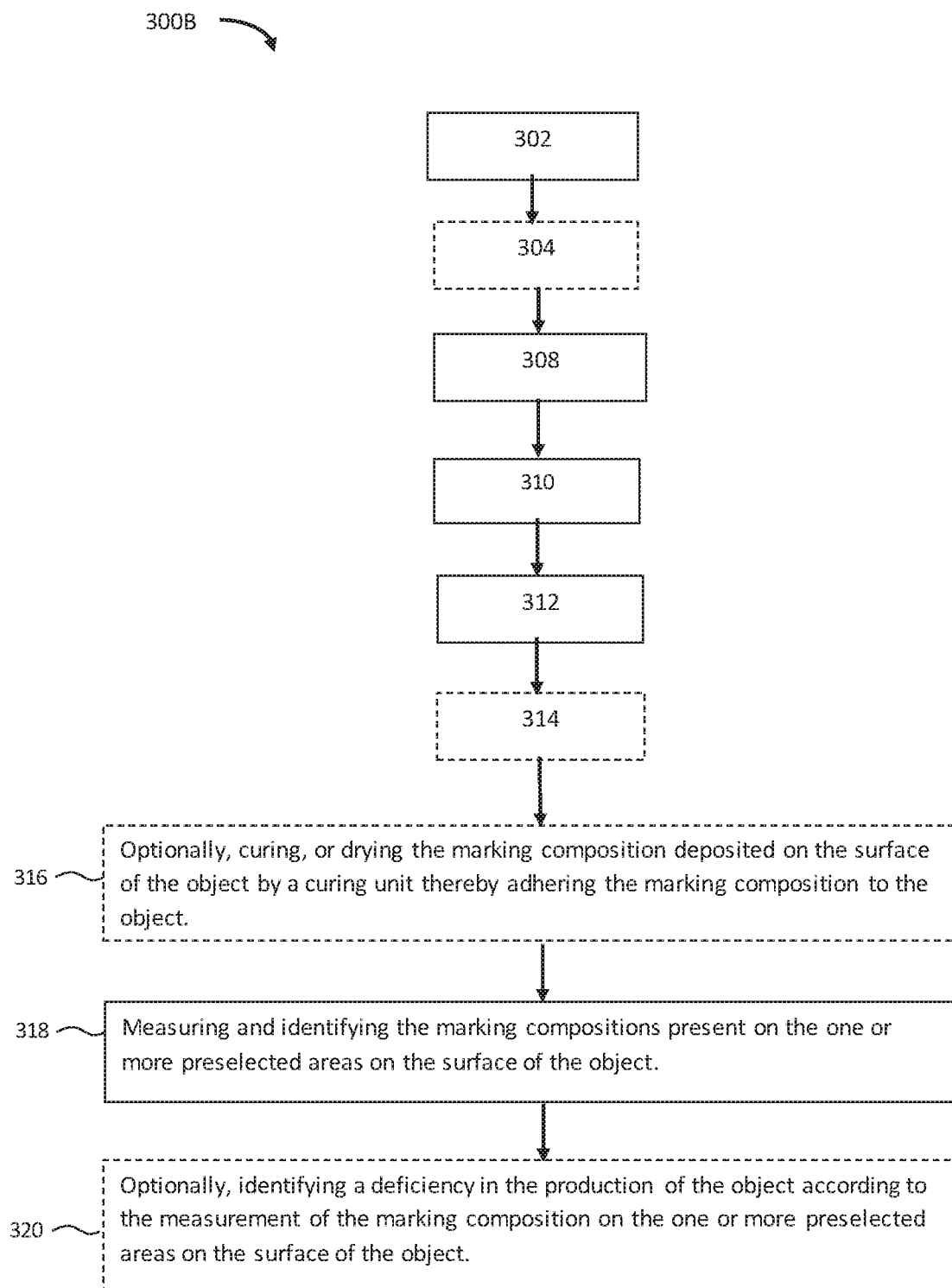

Reference is made to FIG. 3B which is a schematic illustration of a method 300B for applying localized marking on objects according to an embodiment of the present invention. Method 300B includes a verification that the objects are properly marked and may be utilized for identifying deficiencies in the production process of the objects. It should be noted that where method 300B includes operations that are similar to those described above with reference to the method 300A of FIG. 3A such operations are marked by similar reference numerals in FIG. 3A and are not described in details in the following.

Method 300B includes procedure 318, and optional procedures 316 and 320 which are carried out in addition to one or more of the above described procedures 302 to 314 (some of which may be optional as illustrated in the figure). In optional procedure 316 the marking compositions deposited on the preselected areas on the surface of the object undergo curing or drying, thereby contributing to the adherence of the marking composition to the object. In procedure 318 the one or more marking compositions deposited on one or more preselected areas on the surface of the object are measured and identified by measuring the concentrations and/the relative concentration of the markers on the preselected areas on the surface of the object. In an embodiment of the present invention the measurement identifying the marking composition, and in particular the concentrations and/or the relative concentration of the markers, is done by XRF analysis. Namely, the preselected areas on which the marking composition was deposited are irradiated with X-ray or Gamma-ray signals (i.e. primary radiation) and a signal emitted from the markers (and possibly additional materials present in the marking composition or in the surface of the object) in response (i.e. response signal) is detected. The spectrum of response signal is processed so as to determine the concentration and/or relative concentration of the markers (and possibly additional materials present on the object) thereby identifying the specific marking compositions deposited on the surface of the object. The response XRF signal arriving from the object may also be affected by the geometrical configuration of the radiation source the detector and the surface of the object. Namely, the distances and relative angles between the surface of the object, the detector and the source of the primary radiation. Therefore, the measurement results may also be affected by deficiencies in the production of the objects such as deformations in the object's surface in optional procedure 320 deficiencies in the production of the objects are detected and identified according to measurement identifying the marking compositions on the surface of the objects. In particular according to analysis of the XRF spectrum obtained by a detector or a spectrometer (e.g. XRF analyzer) which may be affected by the variations in the shape (e.g. deformations due to failures in the production process) of the object.

The invention claimed is:

1. A system for sequentially marking objects of differing shapes and dimensions in a production line by applying a marking composition to pre-selected areas on the surface of each object, the system comprising:

a marking unit for dispensing a volume of the marking composition in one or more localized pre-selected areas on the surface of each object to be marked;

a holder for positioning each object to be marked in one or more positions relative to the marking unit so as to allow the marking unit to dispense the marking composition on the one or more pre-selected localized areas;

a reading unit for detecting the marking composition applied to each object thereby verifying that the objects are properly marked;

an orientation sensing unit for identifying the orientation of each object to be marked relative to the holder; and a controller for controlling the operation of the holder, the orientation sensing unit, and the marking unit;

wherein, the reading unit identifies the marking composition in the one or more pre-selected areas on the surface of each object by detecting an X ray signal emitted from the marking composition in response to being irradiated by an X-ray or Gamma-ray electromagnetic signal.

2. The system of claim 1, wherein the positions of the preselected localized areas depend on the shape and dimensions of the object being held by the holder.

3. The system of claim 2, wherein the reading unit is configured to identify deformations in the shape of each object with the help of the signal emitted from the marking composition.

4. The system of claim 1, wherein the system is configured to dispense different marking compositions on different preselected areas of each object, wherein each marking composition includes one or more markers.

5. The system of claim 4, wherein the different marking compositions dispensed on each of the preselected areas is determined according to user input and/or the shape and dimensions of the object to be marked.

6. The system according to claim 1, wherein the orientation sensing unit further includes a mechanical sensor.

7. The system according to claim 1, wherein the orientation sensing unit further comprises an optical sensor or a laser sensor.

8. The system of claim 1, wherein the holder is rotatable around at least one axis and configured to rotate the object being held thereby once the marking unit finishes marking a top side of the object to allow the marking unit to mark an opposite side of the object.

9. The system according to claim 1, wherein the marking unit further comprises an injecting system for dispensing the marking composition to a surface of each object.

10. The system according to claim 1, further including a curing unit for curing or drying the marking composition applied to each object.

11. The system of claim 1, wherein the reading unit comprises an emitter for emitting an X-ray or Gamma-ray signal towards each object and a detector for detecting a response X-ray signal emitted from the object in response.

12. The system of claim 11, wherein the reading unit is further configured to identify deficiencies in the production line according to the response X-ray signal detected by the detector.

13. The system according to claim 1, wherein the objects are keys or key blanks.

14. The system of claim 1, further configured to dispense the volume of the marking composition so to create continuous films over each of the one or more localized preselected areas.

15. The system of claim 1, wherein the controller is further configured to identify an orientation of each object relative to locations of the one or more localized preselected areas therein, wherein at least two objects in the production line have different shapes and/or dimensions and wherein the location of the at least one pre-selected area depends on the shape and/or dimensions of the object.

16. The system of claim 1, wherein the controller is further configured to control dispensing the marking composition and/or a speed of the marking process, and wherein the particular type of the marking composition and/or the volume deposited on the one or more localized pre-selected areas are set by the controller according to the shape and dimension of each object.

17. A method for marking objects in a production line, the method comprising:
   a) receiving an object to be marked and holding the object by an object holder;
   b) identifying the orientation of the object to be marked relative to a marking unit by an orientation sensing unit;
   c) positioning the object to be marked and/or a marking unit sequentially in one or more relative positions corresponding to one or more respective preselected areas on the surface of the object; and
   d) dispensing preselected volumes of one or more marking compositions on the one or more preselected areas on the surface of the object;
   e) identifying the one or more marking compositions dispensed on the one or more preselected areas on the surface of the object by detecting an X-ray electromagnetic signal emitted from the one or more marking compositions in response to being irradiated by an X-ray or Gamma-ray electromagnetic signal;
   f) repeating the operations a)-e) for an object of a different shape or dimension.

18. The method of claim 17, further comprising determining the shape and dimensions of the object to be marked according to a user input provided prior to receiving the object.

19. The method of claim 18, further comprising determining the marking composition to be dispensed on the one or more preselected areas according to a user input and/or the shape or dimensions of the object to be marked.

20. The method of claim 17, further comprising the procedure of identifying a deficiency in the production of the objects according to the response signal detected in the detecting step.

21. The method of claim 17, further comprising the procedure of curing or drying the marking composition dispensed on the preselected areas on the surface of the object.

* * * * *